US005089704A

United States Patent [19]

Perkins

[11] Patent Number: 5,089,704

[45] Date of Patent: Feb. 18, 1992

[54] WIDE ANGLE CEILING MOUNTED PASSIVE INFRARED INTRUSION DETECTION SYSTEM

[75] Inventor: Joseph R. Perkins, Roseville, Calif.

[73] Assignee: C & K Systems, Inc., Folsom, Calif.

[21] Appl. No.: 600,207

[22] Filed: Oct. 18, 1990

[51] Int. Cl.[5] .................... G01J 5/08

[52] U.S. Cl. .................... 250/342; 250/353

[58] Field of Search .................... 250/353, 342

[56] References Cited

U.S. PATENT DOCUMENTS

| | | | |
|---|---|---|---|
| 3,703,718 | 11/1972 | Berman | 340/567 |
| 4,087,688 | 5/1978 | Keller | 250/342 |
| 4,514,630 | 4/1985 | Takahashi | 250/342 |
| 4,644,147 | 2/1987 | Züblin | 250/221 |
| 4,707,604 | 11/1987 | Guscott | 250/342 |
| 4,757,204 | 7/1988 | Baldwin et al. | 250/342 |
| 4,778,996 | 10/1988 | Baldwin et al. | 250/353 |
| 4,841,284 | 6/1989 | Biersdorff | 340/567 |

FOREIGN PATENT DOCUMENTS

| | | | |
|---|---|---|---|
| 3818715 | 12/1989 | Fed. Rep. of Germany | 250/353 |

*Primary Examiner*—Constantine Hannaher
*Attorney, Agent, or Firm*—Limbach, Limbach & Sutton

[57] ABSTRACT

A ceiling mounted infrared intrusion detection system achieves 360-degree viewing capability by employing concentric rings of mirrors arranged to view multiple segments within an annular volume of space and focus on a centrally located detector. The rings of mirrors have multiple facets, each of which facets reflects radiation from a segment of space being viewed and focuses the radiation on the detector. The rings are disposed in spaced relationship to one another to provide shorter focal lengths for the mirror facets disposed to view space closest to the detector and a path between the rings through which reflected radiation focused on the detector may pass. the centermost ring is open to permit the detector to view directly therethrough.

20 Claims, 4 Drawing Sheets

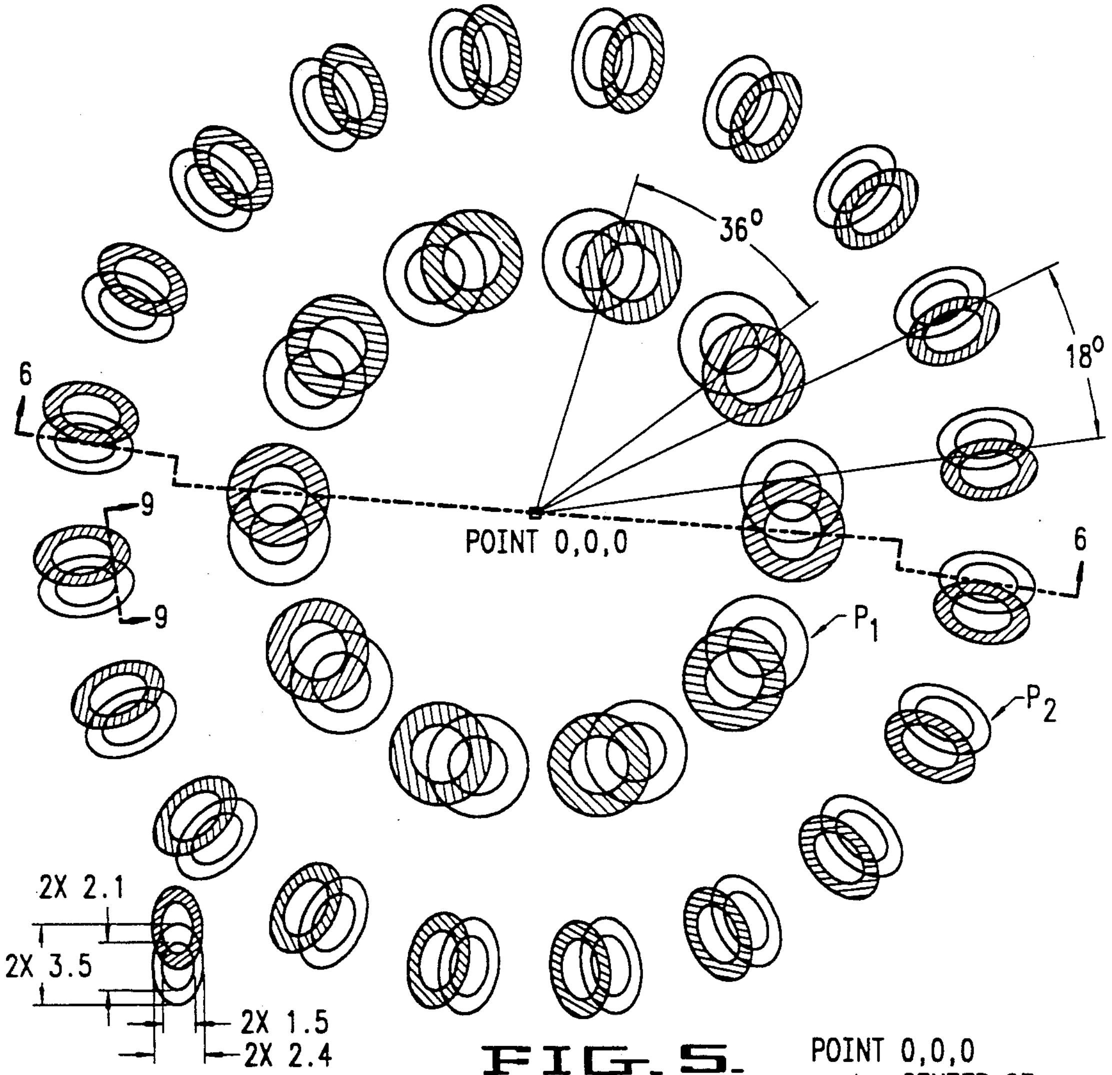
FIG. 5.
FIG. 9.
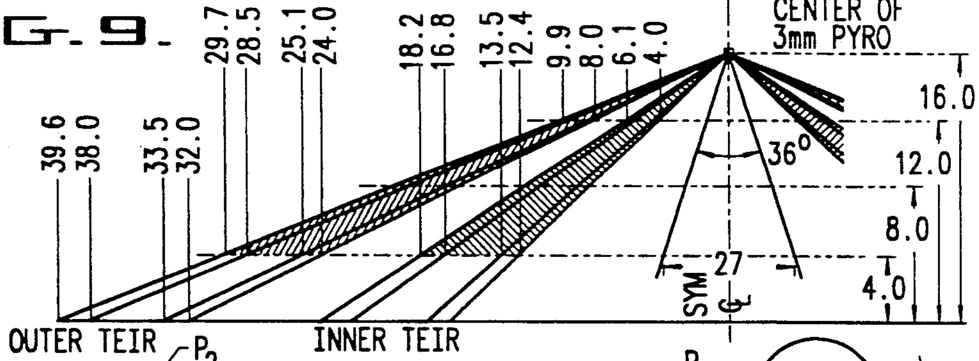
FIG. 6.
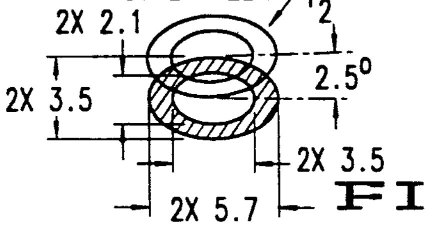
FIG. 8.
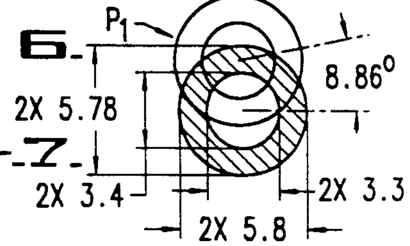
FIG. 7.

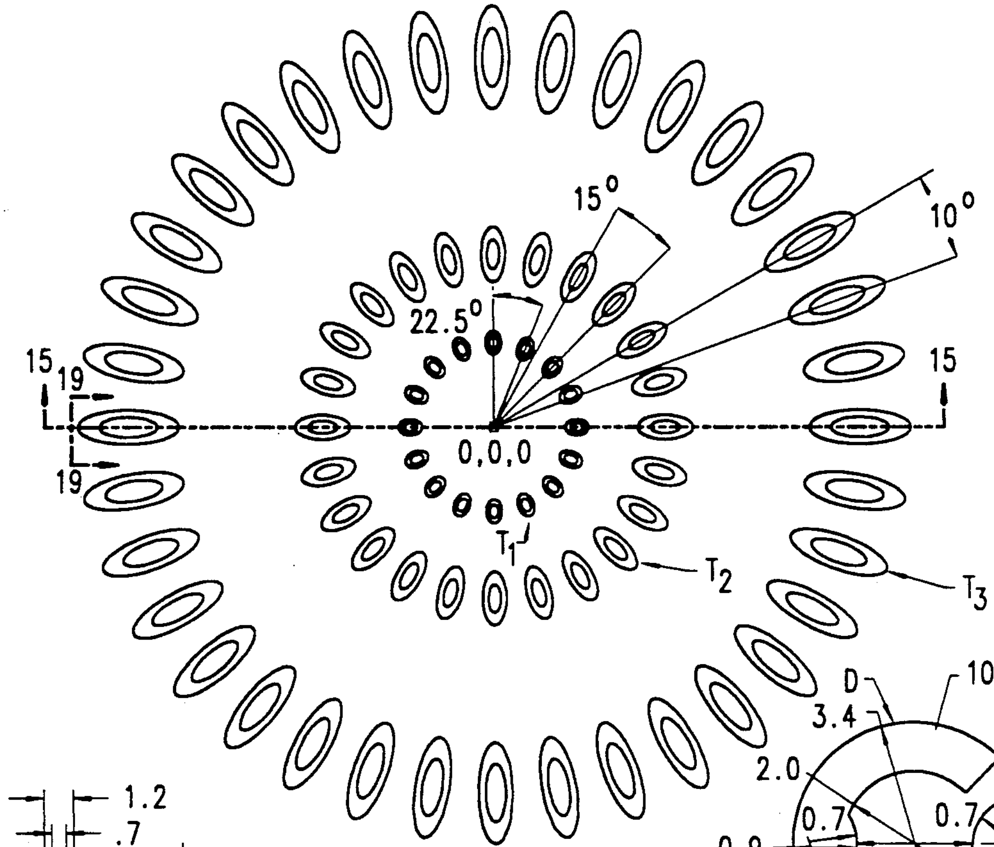
FIG. 14.
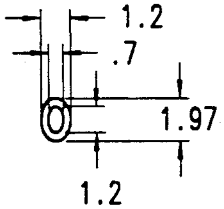
FIG. 19.
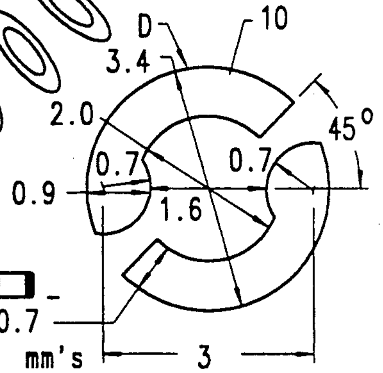
FIG. 20.
FIG. 15.
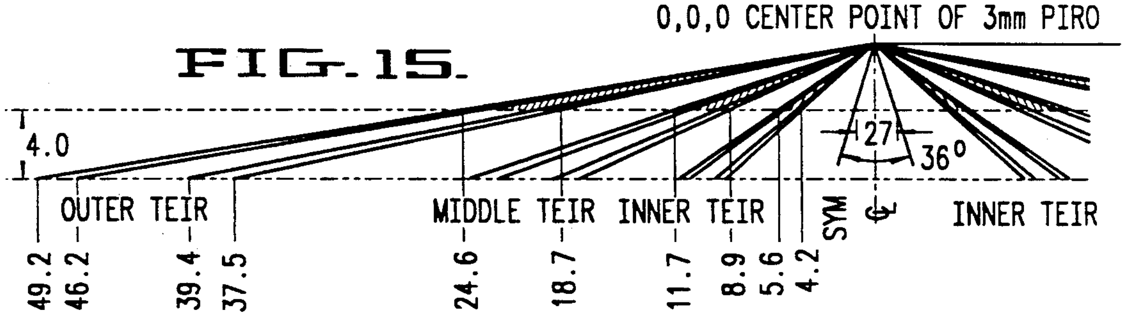
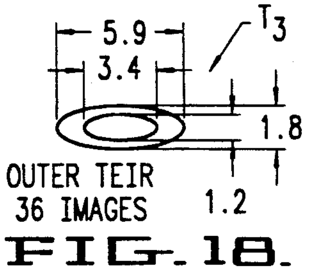
FIG. 18.
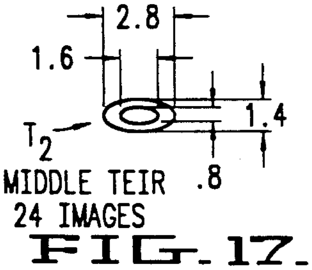
FIG. 17.
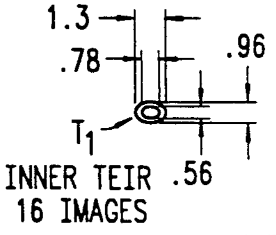
FIG. 16.

WIDE ANGLE CEILING MOUNTED PASSIVE INFRARED INTRUSION DETECTION SYSTEM

BACKGROUND OF THE INVENTION

The present invention relates to a passive infrared intrusion detection system and, more particularly, to such a system for ceiling mounting. In its more specific aspects, the invention is concerned with such a system wherein a single detector may be used to view downwardly through an expanded 360° field.

Passive infrared intrusion detection systems are well known in the art. Typically, an infrared intrusion system comprises a fresnel lens having a plurality of segments, each segment for focusing infrared radiation from a zone in a volume of space onto an infrared detector. U.S. Pat. No. 4,757,204 shows such a system wherein a plurality of such fresnel lenses are arranged in an inverted dome-like configuration to focus infrared radiation from a zone extending 360° around the detector.

In another type of prior art passive infrared intrusion detection system, a mirror having a plurality of segments receives infrared radiation from a plurality of spaced apart zones and reflects radiation and focuses it from the zones onto a single detector. U.S. Pat. No. 3,703,718 shows such a system. wherein FIG. 6 illust4-rates an arrangmeetn desigend for perimeter viewing and ceiling mounting.

The prior art also teaches passive infrared intrusion systems wherein a combination of fresnel lenses and mirrors is used to focus and to reflect infrared radiation from different zones onto a detector. Such a system wherein the fresnel lens focuses infrared radiation in zones which are far away from the detector and the mirror reflects and focuses infrared radiation from zones which are near to the detector is shown in U.S. Pat. No. 4,841,284.

The present invention provides a ceiling mounted passive infrared intrusion detection system which achieves an expanded 360° viewing zone through means of rings of mirrors which are mounted beneath the detector and disposed to detect infrared radiation from multiple segments within a volume of space beneath the detector and focus the reflected radiation onto the detector. The system is compact and thus ideally suited for incorporation into a single housing which may embody a secondary detection system, such as a microwave system. In the preferred embodiment, the system of the invention employs multiple concentric rings of mirrors, each of which is comprised of multiple facets. Each facet views a segment of space and the rings are so arranged as to provide a pattern of viewing which intercepts substantially the entire area to be monitored by the system. The segments of space viewed by the respective rings of mirrors are radially spaced. In one embodiment designed to avoid the possibility that detection might be foiled by a fast moving body, adjacent facets of the mirrors within the rings are paired to view overlapping segments of space.

The rings of mirrors in the present system are radially spaced to provide a path through which focused reflected radiation may pass to the detector. The innermost ring of mirrors has an open center through which the detector of the system may view directly, thus providing viewing coverage immediately below the system, without the interposition of reflecting means. In the preferred embodiment, the rings of mirrors are also so spaced as to provide a shorter focal length for mirror facets disposed to view space closest to the detector.

A principal object of the invention is to provide a new and improved passive infrared detection system suitable for ceiling mounting which has an expanded coverage pattern that is not a function of the field of view of the pyroelectric detector used in the system.

Another object of the invention is to provide such a system which is compact and relies upon reflection to increase the field of view of the detector.

Still another object of the invention is to provide such a system wherein the expanded field of view of the detector is effectively covered with a pattern of viewing segments and wherein the segments produce an elongate pattern upon intersecting a body.

A further object of the invention is to provide such a system wherein a single dual element pyroelectric detector may be used to monitor an expanded volume of space disposed in an area 360° around and below the detector.

Still a further object of the invention is to provide such a detector wherein infrared radiation is gathered and focused by rings of mirrors comprised of multiple facets and certain of the facets are paired to provide overlapping viewing segments.

Another and more specific object of the invention is to provide such a system wherein the viewing segments closest to the detector spread out more quickly than those further from the detector.

Another specific object related to the latter object is to provide such a system wherein such spreading is provided by providing a shorter focal length for the viewing segments closer to the detector and the center of the protected area.

These and other objects will become more apparent when viewed in light of the following detailed description and accompanying drawings.

BRIEF DESCRIPTION OF THE DRAWINGS

FIG. 5 is a diagrammatic view illustrating the projection pattern of the FIG. 1 system, taken on a horizontal plane 4 feet above the floor of the volume of space being monitored;

FIG. 6 is a cross-sectional elevational view of the projection pattern of the FIG. 1 system with the right part broken away, taken on the plane designated by line 6—6 of FIG. 5 and showing dimensions, measured in feet;

FIG. 7 is cross-sectional view through one pair of overlapping projection images from the inner tier of images shown in FIG. 5, showing dimensions measured in feet;

FIG. 8 is a cross-sectional view through one pair of overlapping projection images from the outer tier of images shown in FIG. 5, showing dimensions measured in feet:

FIG. 9 is a cross-sectional view taken on the plane designated by line 9—9 of FIG. 5, illustrating one pair of overlapping projection images of the outer tier as they would appear when intersecting a generally vertically disposed body, with dimensions measured in feet;

FIG. 14 is a diagrammatic view illustrating the projection pattern of the FIG. 10 system, taken on a horizontal plane 4 feet above the floor of the volume of space being monitored;

FIG. 15 is a cross-sectional elevational view of the projection pattern of the FIG. 10 system with the right part broken away, taken on the plane designated by line 15—15 of FIG. 14 passing through the pyroelectric detector and showing dimensions, measured in feet;

FIG. 16 is a cross-sectional view through one of the projection images of the inner tier of images shown in FIG. 14, showing dimensions measured in feet;

FIG. 17 is a cross-sectional view through one of the projection images of the middle tier of images shown in FIG. 14, showing dimensions measured in feet;

FIG. 18 is a cross-sectional view through one of the projection images of the outer tier of images shown in FIG. 14, showing dimensions measured in feet;

FIG. 19 is a cross-sectional elevational view taken on the plane designated by line 19—19 of FIG. 10, illustrating one of the projection images of the outer tier of images as it would appear when intersecting a generally vertically disposed body, with dimensions measured in feet;

FIG. 20 is an enlarged plan view of an arcuate dual element pyroelectric detector of the type used in the preferred embodiment of the invention with dimensions measured in millimeters.

DESCRIPTION OF THE PREFERRED EMBODIMENTS

Figure 1:
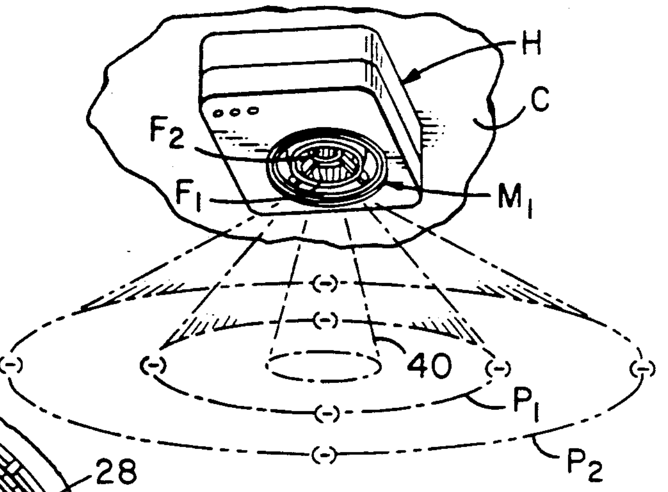
FIG. 1 is a perspective view of a detection system constructed according to the present invention and designed for use with a 16 foot ceiling, showing the system mounted on the ceiling and diagrammatically illustrating the reflective viewing patterns of the system.
Figure 10:
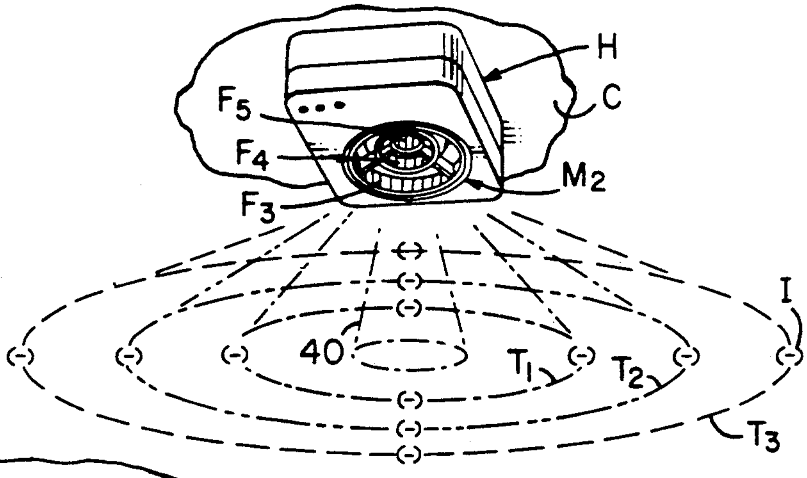
FIG. 10 is a perspective view of a detection system constructed according to the present invention and designed for use with an 8 foot ceiling, showing the system mounted on the ceiling and diagrammatically illustrating the reflective viewing patterns of the system.
Figure 11:
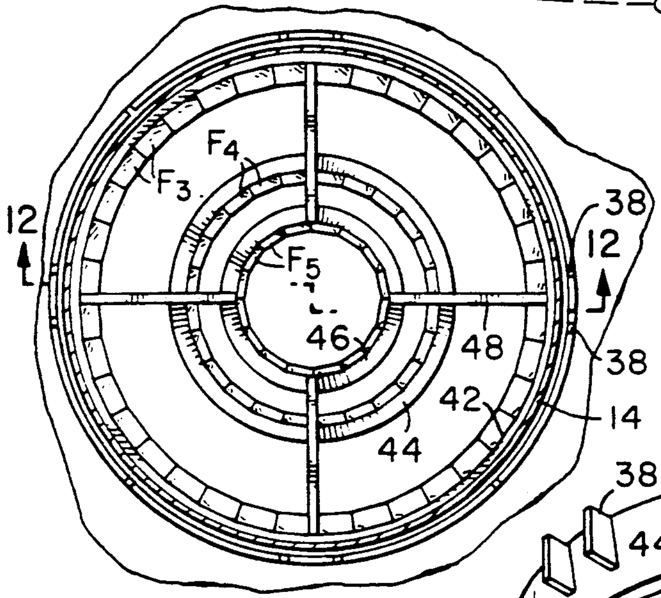
FIG. 11 is a plan view of the FIG. 10 system, viewed from the bottom, illustrating the concentric rings of mirrors.
Figure 13:
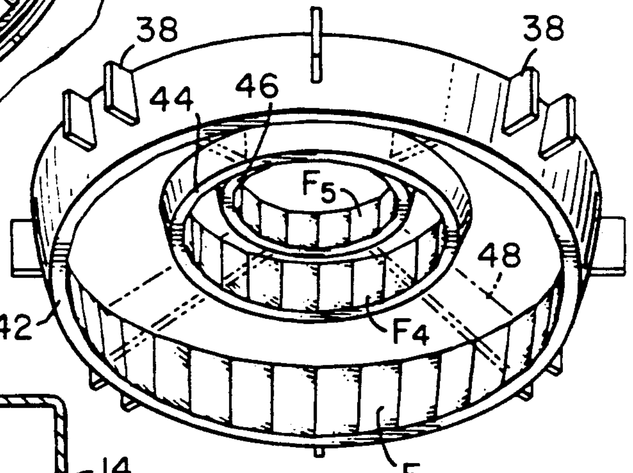
FIG. 13 is a perspective view of the reflector assembly employed in the FIG. 10 system, illustrating the assembly removed from the housing of the system, as it would appear when viewed from below and to one side.
Figure 12:
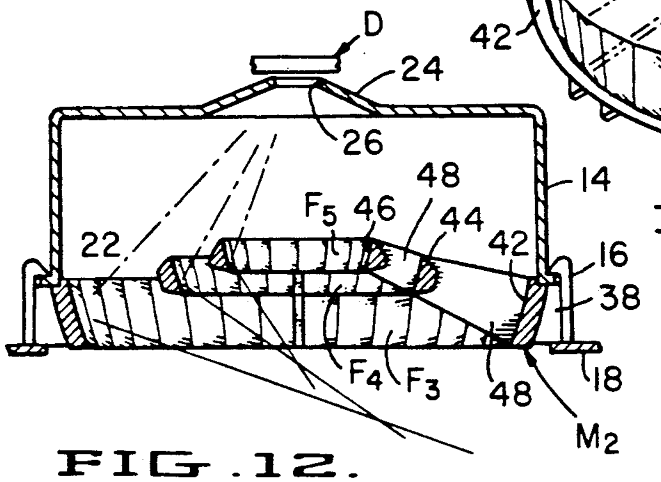
FIG. 12 is a cross-sectional view taken on the plane designated by line 12—12 of FIG. 11.

The detection systems of the FIGS. 1 and 10 embodiments correspond in construction insofar as their housings "H" and internal pyroelectric detection circuitry and mechanism is concerned. The pyroelectric circuitry and mechanism are of the conventional type used in passive infrared detection systems. In the preferred embodiment, the detector "D" is of the dual element pyroelectric type employing spaced arcuate detector elements 10 and 12 (see FIG. 20). An element suitable for use in the system is that of Nippon Ceramic Co. Ltd. of Japan, sold under part no. SEA04-CSI-81S. As mounted in the housing, the detector "D" is horizontally disposed centrally at the focal point of the concentric rings of mirrors of the invention (see FIGS. 3 and 12).

A cylindrical case 14 is mounted in the housing "H" beneath the detector "D" and is secured within the housing by lock tabs 16. The mirror assemblies "$M_1$" and "$M_2$" of the FIG. 1 and 10 embodiments, respeCtively, are concentrically mounted within the casings 14 and also held in place by the lock tabs 16. The lock tabs 16 are resilient and form an integral part of the housing "H" and are adapted to resiliently deflect to permit the Casing 14 and the mirror assemblies "$M_1$" and "$M_2$" to be assembled into place, or removed. From a comparison of FIGS. 3 and 12, it will be seen that the housings "H", casings 14, and detectors "D" of the embodiments shown in these figures are identical; the only difference between the embodiments being in the construction of the mirrors "$M_1$" and "$M_2$".

The mirrors "$M_1$" and "$M_2$" rest on the lower wall 18 of the housing "H" and have a stepped shoulder which engages the underside and inner edge of the case 14. The shoulder for the mirror assembly "$M_1$" is designated by the numeral 20 and that for the mirror "$M_2$" is designated by the numeral 22. Thus, it will be appreciated that the housing 18" and the caSe 14, together with the tabs 16, serves to locate and secure the mirror assemblies "$M_1$" and "$M_2$" within the housing and that the mirror assemblies are interchangeable.

The top of the case 14 is formed with a frustroconical section 14 terminating in an opening 26 formed centrally of the casing in alignment with the detector "D". The opening 26 provides a passage through which focused beams of infrared energy may pass to the detector "D". These beams are diagrammatically illustrated by the phantom lines in FIGS. 3 and 12.

As shown in FIGS. 1 and 10, the housing "H" is mounted horizontally on the ceiling "C" of a room being monitored by the inventive detection system. The exemplary embodiment of the FIG. 1 system is for use with a 16 foot ceiling. The embodiment of FIG. 10 is for use with an 8 foot ceiling. The FIG. 1 embodiment reflects from inner and outer tiers of circular patterns designated "$P_1$" and "$P_2$", respectively. The FIG. 10 embodiment reflects from inner, middle, and outer circular tiers of patterns, designated "$T_1$", "$T_2$", and "$T_3$", respectively. FIGS. 1 and 10 also show conical projection lines leading from the facets on the mirror assemblies "$M_1$" and "$M_2$" and projected pyroelement images "I". It should be appreciated that these images are simply projections and do not physically exist, as infrared detectors are passive and do not project energy.

THE FIG. 1 EMBODIMENT

Figure 2:
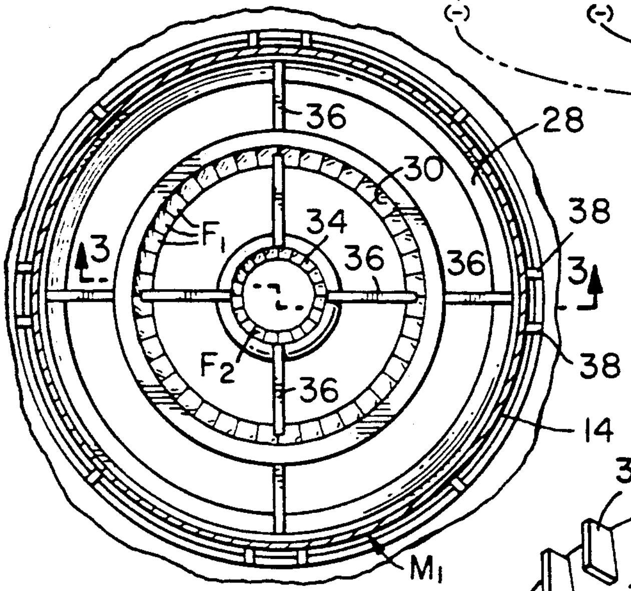
FIG. 2 is a plan view of the FIG. 1 system, viewed from the bottom, illustrating the concentric rings of mirrors.
Figure 4:
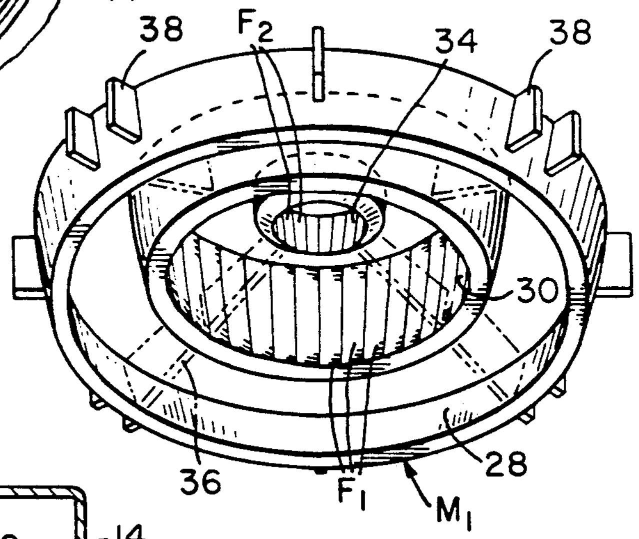
FIG. 4 is a perspective view of the reflector assembly employed in the FIG. 1 system, illustrating the assembly removed from the housing of the system, as it would appear when viewed from below and to one side.

The key component of this embodiment comprises the mirror assembly "$M_1$". This may best be seen from FIGS. 2, 3 and 4 and comprises a monolithic plastic element comprised of an outer mounting ring 28, an intermediate reflecting ring 3o and a center refleCting ring 34. The rings are disposed in spaced concentric relationship and held together by radial ribs or spokes 36 which are integrally formed with the rings and extend therebetween. The mounting ring 28 has spaced ears 38 which engage around the tabs 16 to secure the mirror assembly "$M_1$" against rotation when it is received within the housing "H". These ears rest upon the inner surface of the housing "H" to position the assembly "$M_1$" within the casing 14. The inside of the intermediate reflecting rings 30 is formed With 40 reflecting facets "$F_1$" arranged in pairs to create the outer tier "$P_2$" of projection images shown in FIGS. 1 and 5. The inside of the center reflecting ring 34 is formed with twenty reflecting facets "$F_2$" arranged in pairs to create the inner tier "$P_1$" of projection images shown in FIGS. 1 and 5. From the projection lines shown in FIG. 3, it will be seen that the space between the rings 32 and 34 provides a path through which images may reflect from the room being viewed and be focused on the detector "D". The path for images being viewed by the facets of the ring 34 is through the center of the ring. The center of the ring also provides an opening through which the detector "D" may view directly, as depicted by the conical viewing area 40 in FIG. 1.

Each mirror facet of the reflecting rings 30 and 34 is polished and coated with a highly reflective material, such as chrome. The facets are precisely placed so as to create the image patterns shown in FIGS. 5 to 9. Overlapping of the images assures that a fast moving intruder cannot avoid detection. It is possible that non-overlapping detection patterns could be avoided by an intruder who moves across the detection patterns very quickly. This results because each detection pattern actually consists of two halves, one of which causes a positive response and one of which causes a negative response. If the intruder is able to move through the positive and the negative portion of the lobe faster than the unit can respond, the positive response will be cancelled by the negative response. At slow speeds, the presence of both a positive going and a negative going portion is not a problem, and may actually improve the performance of the detector. Normally the intruder will move into the positive portion, out of the positive portion, into the negative portion, and out of the negative portion, thus creating at least two triggers to the alarm circuits on the single lobe, with the possibility of four triggers at slow speeds. Problems only occur with fast moving intruders when the positive portion gets blended with the negative portion.

To combat the latter problem, the FIG. 1 embodiment was designed so that the lobes are very large. This makes it very difficult for an intruder to get through both the positive and negative portion fast enough to cause "blending". This creates another problem, however, since the number of lobes required to cover the designated region is considerably reduced and, therefore, the number of triggers produced by a slow moving intruder is also reduced.

To ensure that the number of responses at slower speeds was not reduced, the number of large lobes in the FIG. 1 embodiment is doubled and adjacent lobes are overlapped. Thus, when an intruder goes through the pattern, he moves into the first lobe's positive region, out of the first lobe's positive region, into the second lobe's positive region, out of the second lobe's positive region, into the first lobe's negative region, out of the first lobe's negative region, into the second lobe's negative region, and out of the second lobe's negative region. The two overlapped lobes occupy about the same distance as two smaller lobes would and, therefore, allow for about as many triggers per step by the intruder. The low speed performance is thereby preserved, and high speed performance is enhanced because when consecutive positive responses are blended they do not cancel each other. Thus, the effective frequency response of the FIG. 1 embodiment is more than doubled and it becomes impossible to fool the system by running.

Figure 3:
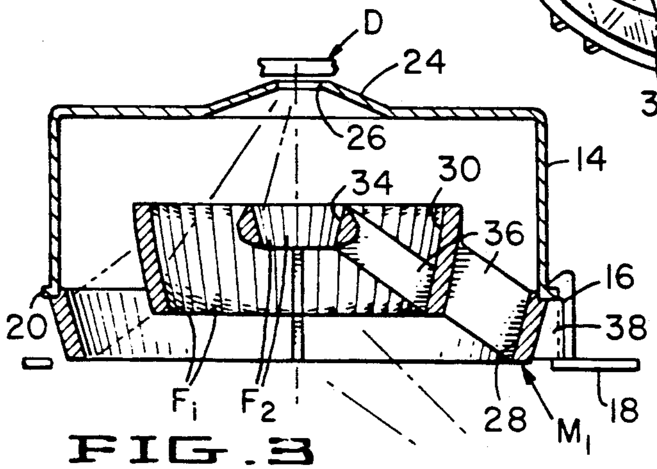
FIG. 3 is a cross-sectional view taken on the plane designated by line 3—3 of FIG. 2.

From FIG. 3 it will be seen that the center reflecting ring 34 is closer to the detector than the intermediate reflecting ring 30. This is part of the design to provide a shorter focal length for the inner tier of images than for the outer tier of images. Such a shorter length increases the size of the images for the inner tier, as may be seen from FIG. 5.

THE FIG. 10 EMBODIMENT

The mirror assembly "$M_2$" of the FIG. 10 embodiment is of a monolithic plastic construction similar to that of the assembly "$M_1$" and is comprised of rings of mirrors having polished plated facets. In the case of the assembly "$M_2$", all three rings of the assembly are formed with reflecting facets. The outer ring, designated 42, is formed with 36 reflecting facets "$F_3$"; the middle ring, designated 44, is formed with 24 reflecting facets "$F_4$"; and, the center ring, designated 46, is formed with 16 reflecting facets "$F_5$". The facets "$F_3$", "$F_4$" and "$F_5$" reflect from the outer, middle and inner circular tier patterns "$T_3$", "$T_2$" and "$T_1$", respectively. This may be seen from both FIG. 10 and FIGS. 14 to 15. From FIG. 14 it will be seen that the image patterns provided by the FIG. 10 embodiment do not overlap, as do those of the FIG. 1 embodiment. Like the FIG. 1 embodiment, reflected energy is reflected from the image area and focused on the detector "D". This energy passes between the outer and middle rings and the middle and center rings and also through the opening through the center ring. Similarly to the embodiment of FIG. 1, the reflecting rings of the FIG. 10 embodiment are at different elevations so that the focal lengths of the facets viewing the areas closest to the detector are shorter than those viewing the areas at greater distances from the detector. Also as with the FIG. 1 embodiment, the detector "D" in the FIG. 10 embodiment views directly through the center of the center ring 46.

The concentric rings of the assembly "$M_2$" are held in place relative to one another by radial ribs or spokes 48 extending therebetween. The outer ring 42 functions both as the mounting ring for the assembly and as a reflecting ring. Ears 38 on the outer ring engage between the tabs 16 and rest on the inside of the housing 18.

OPERATION OF THE DETECTOR

As described in the foregoing discussion, the detector "D" is of the conventional dual element pyroelectric type, although the preferred construction is one using spaced circular rings. In the preferred embodiment, the sensor system has two settings, one for a pulse count of one and the other for a pulse count of two. To get a single pulse, the energy focused on the two elements of the detector must be different. There will be an output if an image comes into focus and then leaves the field of view of a single facet of a mirror. If a pulse count of two is selected, the image must pass from one facet to another.

CONCLUSION

While preferred embodiments of the invention have been illustrated and described, it should be understood that the invention is not intended to be limited to these embodiments, but rather is defined by the accompanying claims. For example, it is anticipated that the number of reflecting rings may vary and that the images viewed by the rings may be combined in single and overlapping image forms different from the illustrated embodiments.

I claim:

1. An infrared intrusion detection system for ceiling mounting for detecting an intruder from a volume of space beneath the housing, said system comprising:

(a) a housing adapted to be mounted on the ceiling;

(b) an infrared detector carried by the housing;

(c) at least one ring-shaped mirror means carried by the housing, each mirror means having a pluraiyt of mirror facets disposed both to reflect infrared radiation directly from segments within said volume of sapce and to focus the reflected radiation on the detector.

2. An intrusion detection system according to claim 1 wherein the ring-shaped mirror means has an open center and the detector is disposed to view directly through the center.

3. An intrusion detection system according to claim 1 wherein the segments are disposed in an annular array extending 360 degrees around the detector.

4. An intrusion detection system according to claim 1 wherein at least certain of the segments from which the mirror means reflects partially overlap.

5. An intrusion detection system according to claim 1 wherein a plurality of generally concentric ring-shaped mirror means are carried by the housing to reflect infrared radiation from spaced segments of space within the volume of space beneath the housing and focus reflected radiation on the detector.

6. An intrusion detection system according to claim 5 wherien the plurality of ring-shaped mirro means are spaced to provide a path therebetween adjcent mirror means thrugh which relfected radiation may pass to the detector.

7. An intrusion detection system accoridng to claim 6 wherein the ring-shaped mirror means are so spaced that the focal length of the respective means increases as the distance from the detector to the semgents of space from which a mirror means reflects increases.

8. An intrusion detection system according to claim 5 wherein the segments from which each of the ring-shaped mirror measn reflect are disposed in an annular array exending 360 degrees around the detector.

9. An intrusion detection system according to claim 5 wherein the segments from which the respective mirror means reflect are radially spaced.

10. An intrusion deteotion system according to claim 1 wherein the detector has dual pyroelectric elements spaced from one another and the mirror means focus on the detector so as to energize one element at a time as an infrared emitting body passes through a segment from which the mirror means reflect.

11. An intrusion detection system according to claim 10 wherein the dual elements are arcuate and, together, define a generally circular configuration interrupted by space between the elements.

12. An intrusion detction system according to claim 1 wherein each one of said plruality of mirror facets reflects from a single segment with the volume of space.

13. An intrusion detection system accoridng to claim 12 wherein the facets of the mirror means are disposed to reflect from semgents disposed around the detector through 360 degrees.

14. A method of expanding the area monitored by a ceiling mounted dual-element infrared detector, siad method comprising:

(a) mounting a first ring of mirrors beneath the detector in generally concentric relatinoshi thereto so that the mirrors reflect infrared radiation directly from multiple segments through 360 degrees within a volume of space beneath the detector nad focus reflected radiation on the detector; and (b) energizing the detector to create a signal in response to focusing of infrared radiation thereon by the mirrors.

15. A method accoring to claim 14, further comprsing:

(a) formign the ring to have an open center; and, (b) locating the ring relative to the detector so that the detector may detect infrared radiation directly through siad open center.

16. A method according to claim 14 where certain of the mirrors witin the ring are paired so that the segments from which the paired mirrors reflect partially overlap.

17. A method according to claim 14, further comprising mounting a second ring of mirrors beneath the detector in generally concentric relationship to the first ring so that the mirrors of the second ring reflect infrared radiation from multiple segments spaced from those from which the first ring reflects through 360 degrees within a volume of space beneath the deteotor and foous refleoted radiation on the deteotor.

18. A method according to claim 17 wherein the segments from which the respective rings reflect are radially spaced.

19. An infrared intrusion detection system for moutning on a ceiling for detecting an intruder in a volume of space beneath said ceiling, said system comprising:

a plruality of ring-shaped mirror means, each mirror means having a plurailty of mirror segments, each segment for receiving infrared radiation from siad volume and for relfecting and focusing said radiation to a focus;

each of siad plurilay of mirror means being positioned substantially concentric to one another; and an infrared detector opsitioned at siad focus for receiving siad infrared radiation focused from siad mirror segments.

20. The system of claim 19 wherein each of said mirror means is spaced apart from one another to provide a path therebetween through wihch refelcted infrared radiation may pass to the detector.

* * * * *

UNITED STATES PATENT AND TRADEMARK OFFICE
CERTIFICATE OF CORRECTION

PATENT NO. : 5,089,704

DATED : February 18, 1992

INVENTOR(S) : Joseph R. Perkins

It is certified that error appears in the above - identified patent and that said Letters Patent is hereby corrected as shown below:

Col. 4, line 57, change "3o" to --30--.
Col. 5, line 14, change "3o" to --30--.
Col. 6, line 3, change "3o" to --30--.

Column 7:

Claim 1, line 7, change "pluraiyt" to --plurality--;
line 10, change "sapce" to --space--;

Claim 6, line 2, change "wherien" to --wherein--;
line 2, change "mirro" to --mirror--;
line 3, change "adjcent" to --adjacent--;
line 4, change "thrugh" to --through--;
line 4, change "relfected" to --reflected--;

Claim 7, line 1, change "accoridng" to --according--;
line 4, change "semgents" to --segments--;

Claim 8, line 3, change "measn" to --means--;
line 4, change "exending" to -- extending--;

Claim 10, line 1, change "deteotion" to --detection--;

Column 8:

Claim 12, line 1, change "detction" to --detection--;
line 2, change "plruality" to --plurality--;

UNITED STATES PATENT AND TRADEMARK OFFICE

CERTIFICATE OF CORRECTION

PATENT NO. : 5,089,704

DATED : February 18, 1992

INVENTOR(S) : Joseph R. Perkins

It is certified that error appears in the above - identified patent and that said Letters Patent is hereby corrected as shown below:

Column 8:

Claim 13, line 1, change "accoridng" to --according--;
line 3, change "semgents" to --segments--;

Claim 14, line 2, change "siad" to --said--;
line 5, change "relatinoshi" to --relationship--;
line 8, change "nad" to --and--;

Claim 15, line 1, change "accoring" to --according--;
line 1, change "comprs-" to --compris- --;
line 3, change "formign" to --forming--;
line 6, change "siad" to --said--;

Claim 16, line 2, change "witin" to --within--;

Claim 17, line 7, change "deteotor" to --detector--;
line 8, change "foous refleoted" to --focus reflected--;
line 8, change "deteotor" to --detector--;

Claim 19, line 1-2, change "moutning" to --mounting--;
line 4, change "plruality" to --plurality--;
line 6, change "siad" to --said--;
line 7, change "relfecting" to --reflecting--
line 9, change "siad plurilay" to --said plurality--;
line 11, change "opsitioned at siad" to---positioned at said--
line 12, change "siad" (both occurrences) to --said--;

Claim 20, line 3, change "wihch refelcted" to --which reflected--.

UNITED STATES PATENT AND TRADEMARK OFFICE
CERTIFICATE OF CORRECTION

PATENT NO. : 5,089,704

DATED : February 18, 1992

INVENTOR(S) : Joseph R. Perkins

It is certified that error appears in the above-identified patent and that said Letters Patent is hereby corrected as shown below:

Claim 20, column 8, line 3, change "which refelcted" to --which reflected--.

Signed and Sealed this

Fourth Day of May, 1993

Attest:

MICHAEL K. KIRK

*Attesting Officer* *Acting Commissioner of Patents and Trademarks*